(12) United States Patent
Prieto Sanchez et al.

(10) Patent No.: US 12,736,170 B2
(45) Date of Patent: Sep. 15, 2026

(54) VEHICLE DOOR STORAGE SYSTEM

(71) Applicant: Ford Global Technologies, LLC, Dearborn, MI (US)

(72) Inventors: Cesar Adolfo Prieto Sanchez, Mexico City (MX); Daniela Perez Vivas, Mexico City (MX); Adolfo Alan Gonzalez Aldaraca, Naucalpan de Juárez (MX); Ricardo Aramis Jimenez Villagran, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/898,975

(22) Filed: Sep. 27, 2024

(65) Prior Publication Data

US 2026/0092668 A1 Apr. 2, 2026

(51) Int. Cl.
*F16M 11/04* (2006.01)
*B60J 11/06* (2006.01)

(52) U.S. Cl.
CPC .............. *F16M 11/04* (2013.01); *B60J 11/06* (2013.01)

(58) Field of Classification Search
CPC .......... B60J 11/06; F16M 11/04; B62B 3/108; B25H 1/0007; B62D 65/06; B62D 65/026; B62D 65/024; B60R 11/06; E04F 21/0023
See application file for complete search history.

(56) References Cited

U.S. PATENT DOCUMENTS 2,799,920 A * 7/1957 Hansen .................... B21D 1/12 269/221
2,803,872 A * 8/1957 Massa .................... F16M 11/12 269/106
2,908,403 A * 10/1959 Browder, Jr. ........ B25H 1/0007 269/223
3,782,713 A * 1/1974 Yount ...................... B25H 5/00 269/297
4,050,671 A * 9/1977 Coleman ................ B62B 3/108 254/7 R
4,467,944 A 8/1984 Manko et al.
4,836,374 A * 6/1989 Hutchins ................ A45C 13/02 206/592
5,009,406 A * 4/1991 McDermott ......... B25H 1/0007 269/17
5,033,163 A * 7/1991 Kaibuki ................. B62D 65/06 411/39
5,169,114 A * 12/1992 O'Neill ............... E05B 73/0082 248/680
5,294,098 A * 3/1994 Bundy ................. B25H 1/0007 254/8 B (Continued)

FOREIGN PATENT DOCUMENTS

CA 3049230 A1 3/2020

*Primary Examiner* — Patrick D Hawn
(74) *Attorney, Agent, or Firm* — Vichit Chea; Carlson, Gaskey & Olds, P.C.

(57) ABSTRACT

A vehicle door holder system includes a primary bracket, an interior side upright extending upward from the primary bracket, an exterior side upright extending upward from the primary bracket, a secondary bracket, and a brace extending from the secondary bracket to the exterior side upright. A vehicle door that has been removed from the vehicle can be supported between the interior side upright and the exterior side upright.

16 Claims, 4 Drawing Sheets

(56) References Cited

U.S. PATENT DOCUMENTS 5,429,285 A * 7/1995 Kim .................... B60R 11/06 206/573
5,460,469 A * 10/1995 Young .................... B66F 19/00 254/5 C
5,584,635 A * 12/1996 Stapelmann ............ B62B 3/108 414/11
5,927,731 A * 7/1999 Clarke ................ E04F 21/0023 280/47.24
6,024,351 A * 2/2000 Metoyer ............... E04F 21/003 269/133
6,113,090 A * 9/2000 Hui .................... B60J 5/0468 269/902
6,231,034 B1 * 5/2001 Walker ................ E04F 21/0023 269/901
6,341,788 B1 * 1/2002 Ciccone ................ B25H 1/00 280/47.28
6,505,844 B2 * 1/2003 Hallman ............ E04F 21/0023 118/500
7,008,165 B1 * 3/2006 Grimes .................. B66F 9/06 414/800
7,014,413 B2 * 3/2006 Young ................ E04F 21/0023 414/743
7,036,697 B2 * 5/2006 Hwang ................. B60R 11/06 206/373
7,784,802 B2 * 8/2010 White .................. B62B 3/108 280/47.41
7,896,367 B1 * 3/2011 Suprono ............... B62B 1/268 280/47.15
8,104,787 B2 * 1/2012 Haley ................. B62B 3/108 108/115
8,517,342 B2 * 8/2013 Dunca .................. B66F 15/00 414/10
8,695,997 B1 * 4/2014 Martinez ............... B62B 3/002 280/79.2
9,381,930 B2 * 7/2016 Septimio ................ B62B 3/04
9,539,938 B1 * 1/2017 Bosco ................... B60J 7/106
9,604,582 B2 * 3/2017 Mayfield ............... B60R 11/06
10,005,173 B2 * 6/2018 Furey .................. B25B 5/006
10,017,199 B2 * 7/2018 Silva ..................... B62B 3/02
10,399,486 B2 9/2019 Salter et al.
10,407,087 B1 9/2019 Baker et al.
10,816,134 B2 10/2020 Meldrum
11,377,038 B2 7/2022 Salter et al.
11,491,925 B2 * 11/2022 Myszkowski ............ B60R 7/08
11,518,459 B2 12/2022 Hall
11,603,151 B2 * 3/2023 Brown .................. B62D 65/06
12,030,570 B2 * 7/2024 Schultheis .......... B25H 1/0007
12,084,001 B2 * 9/2024 Smith ..................... B60R 9/06
2008/0022462 A1 * 1/2008 Benson ................. B25H 3/02 7/100
2009/0152224 A1 * 6/2009 Hsieh ..................... B25H 1/00 211/170
2017/0151491 A1 * 6/2017 Collins ................. B23P 19/04
2021/0025546 A1 1/2021 Meldrum
2022/0396323 A1 12/2022 Schultheis et al.

* cited by examiner 14
62
34
32
30

14
58
54
74
70
30
78
40
36
88
34
32
84
38

VEHICLE DOOR STORAGE SYSTEM

TECHNICAL FIELD

This disclosure relates generally to vehicle doors and, more particularly, to storing vehicle doors that have been removed from a vehicle.

BACKGROUND

Some vehicles, especially vehicles designed for off-road use, include doors that can be removed. The vehicle can be operated with the doors removed to provide the driver and passengers with an open air driving experience.

SUMMARY

In some aspects, the techniques described herein relate to a vehicle door holder system, including: a primary bracket; an interior side upright extending upward from the primary bracket; an exterior side upright extending upward from the primary bracket; a secondary bracket; and a brace extending from the secondary bracket to the exterior side upright.

In some aspects, the techniques described herein relate to a vehicle door holder system, wherein the brace is pivotably secured to the exterior side upright.

In some aspects, the techniques described herein relate to a vehicle door holder system, wherein the brace is received within a pocket of the secondary bracket.

In some aspects, the techniques described herein relate to a vehicle door holder system, wherein the interior side upright and the exterior side upright are configured to support a vehicle door.

In some aspects, the techniques described herein relate to a vehicle door holder system, wherein the interior side upright is configured to interface with an interior side of a vehicle door and the exterior side upright is configured to interface with an exterior side of the vehicle door.

In some aspects, the techniques described herein relate to a vehicle door holder system, wherein the interior side upright is configured to be received within a recess of the vehicle door.

In some aspects, the techniques described herein relate to a vehicle door holder system, further including a support block positioned within a pocket of the primary bracket between the interior side upright and the exterior side upright, the support block configured to interface with a bottom side of a vehicle door.

In some aspects, the techniques described herein relate to a vehicle door holder system, wherein the support block is foam.

In some aspects, the techniques described herein relate to a vehicle door holder system, wherein primary bracket includes a first pocket configured to receive the interior side upright, and a second pocket configured to receive the interior side upright, the interior side upright spaced a first distance from the exterior side upright when the interior side upright is received within the first pocket, the interior side upright spaced a different, second distance from the exterior side upright when the interior side upright is received within the second pocket.

In some aspects, the techniques described herein relate to a vehicle door holder system, further including a storage case configured to enclose the primary bracket, the interior side upright, the exterior side upright, the secondary bracket, and the brace.

In some aspects, the techniques described herein relate to a vehicle door holder system, wherein the storage case includes a first pocket that holds the primary bracket, a second pocket that holds the interior side upright and the brace, a third pocket that holds the exterior side upright, and a fourth pocket that holds the secondary bracket.

In some aspects, the techniques described herein relate to a vehicle door holder system, wherein the storage case includes a base and a cover, the base providing the first pocket, the second pocket, the third pocket, and the fourth pocket.

In some aspects, the techniques described herein relate to a vehicle door holder system, wherein the storage case includes a plurality of magnets that secure the cover to the base.

In some aspects, the techniques described herein relate to a vehicle door holder system, wherein the base is a foam base.

In some aspects, the techniques described herein relate to a vehicle door holder system, wherein the brace is pivoted relative to the interior side upright to a storage position when the brace and the interior side upright are enclosed within the storage case.

In some aspects, the techniques described herein relate to a vehicle door holder system, further including a vehicle door supported in an upright position between the interior side upright and the exterior side upright.

In some aspects, the techniques described herein relate to a vehicle door holder system, including: a storage case; and a plurality of door holder components enclosed within the storage case.

In some aspects, the techniques described herein relate to a vehicle door holder system, wherein the plurality of door holder components include a primary bracket within a first pocket of the storage case, an interior side upright and a brace within a second pocket of the storage case, an exterior side upright within a third pocket of the storage case.

In some aspects, the techniques described herein relate to a vehicle door holder system, wherein the plurality of door holder components further includes a secondary bracket within a fourth pocket of the storage case.

In some aspects, the techniques described herein relate to a vehicle door holder system, wherein the storage case includes a base and a cover, wherein the first pocket, the second pocket, the third pocket, and the fourth pocket are provided within the base.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Some vehicles include removeable doors. A user of the vehicle may wish to operate such a vehicle with the doors removed to provide the user with an open-air driving experience. This disclosure relates generally to storing vehicle doors. More particularly, this disclosure relates to a door holder used to hold vehicle doors removed from a vehicle. The door holder can support the doors in an upright position. The door holder can be provided by a plurality of components that can be disassembled and stored within a case, which can facilitate transporting the door holder to a desired location. The door holder can be considered modular.

Figure 1:
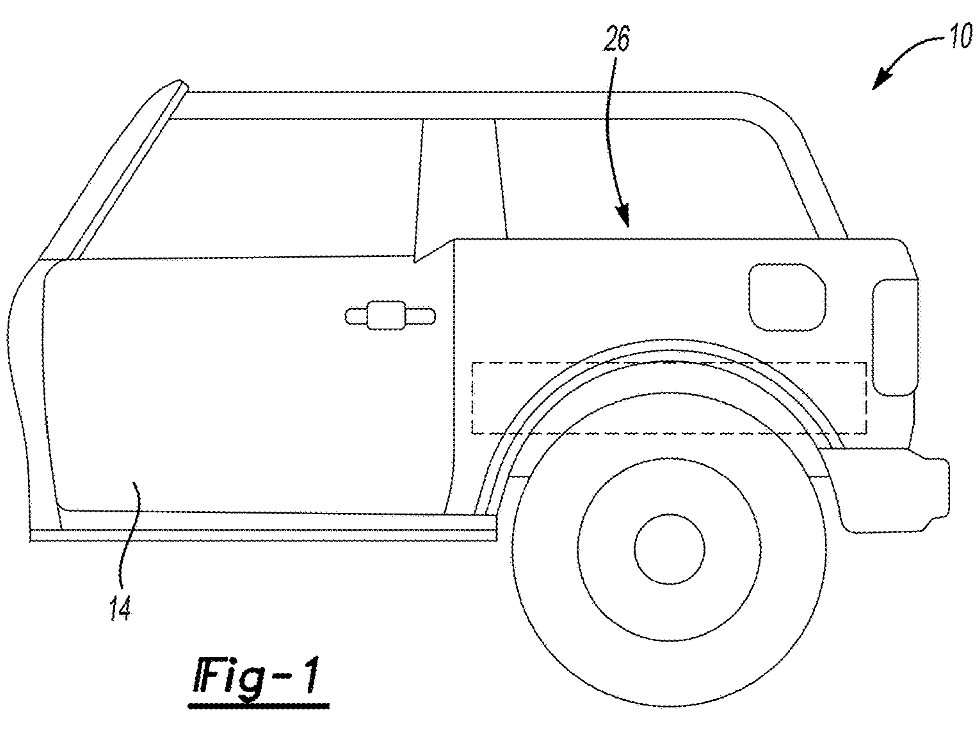
FIG. 1 illustrates a side view of a vehicle having at least one door.
Figure 2:
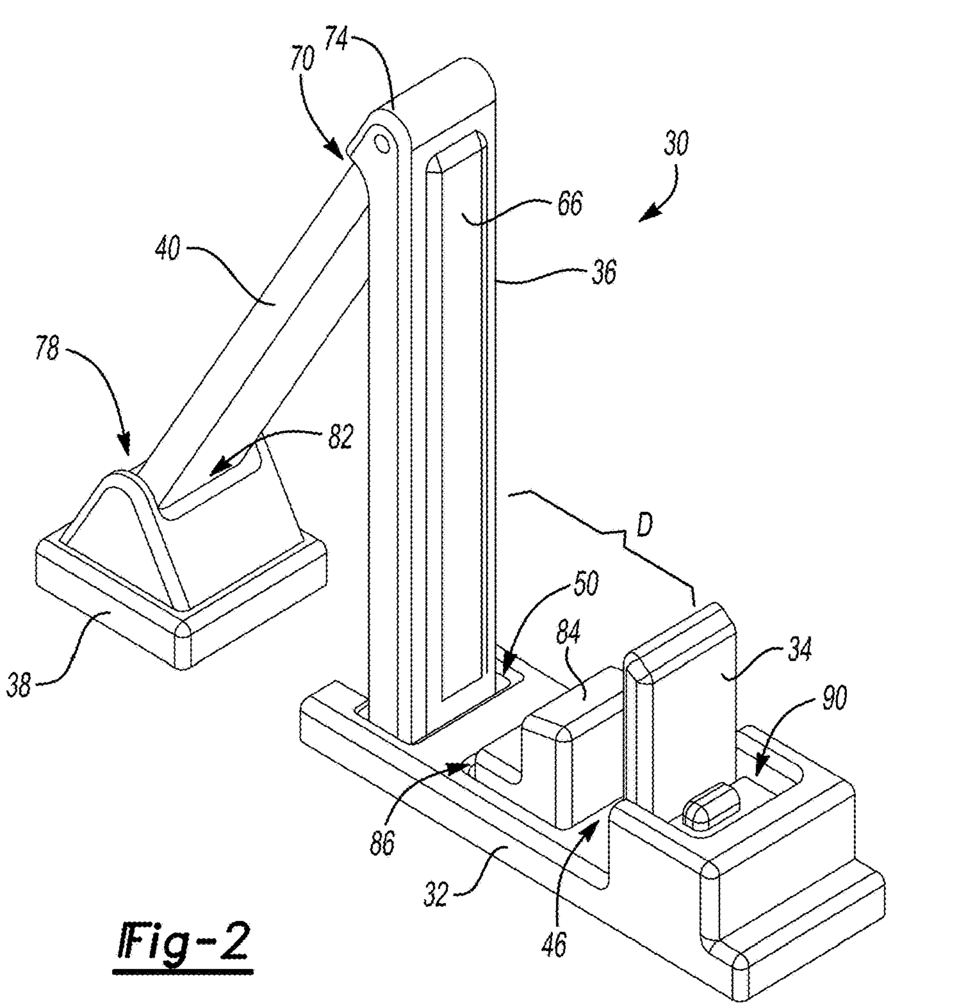
FIG. 2 illustrates a perspective view of a door holder assembly according to an exemplary aspect of the present disclosure when the door holder assembly is assembled.
Figures 3, 4:
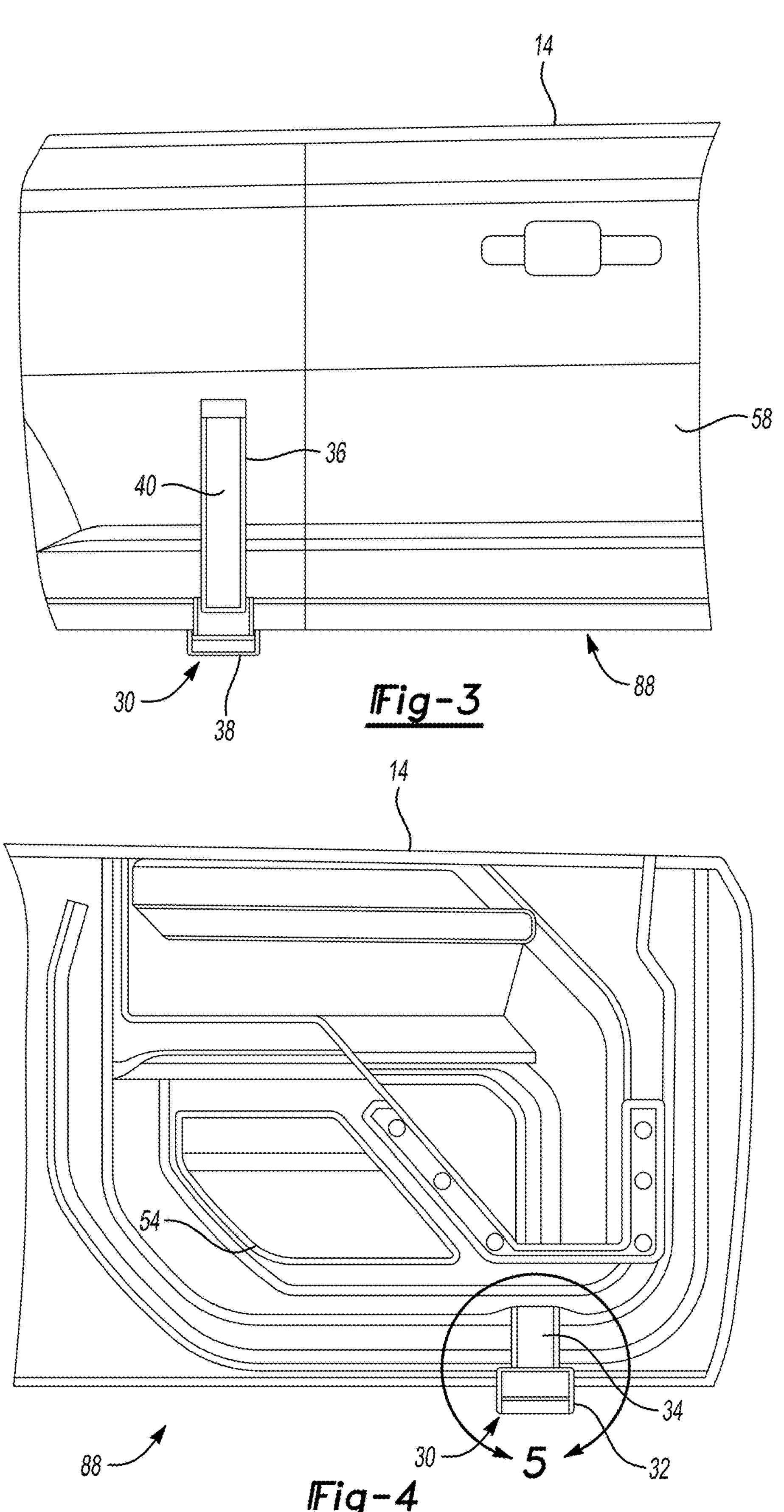
FIG. 3 illustrates a side view of a door from the vehicle of FIG. 1 supported by the door holder assembly of FIG. 2.
FIG. 4. illustrates a side view of the door from the vehicle of FIG. 1 supported by the door holder assembly of FIG. 2.
Figures 5, 6:
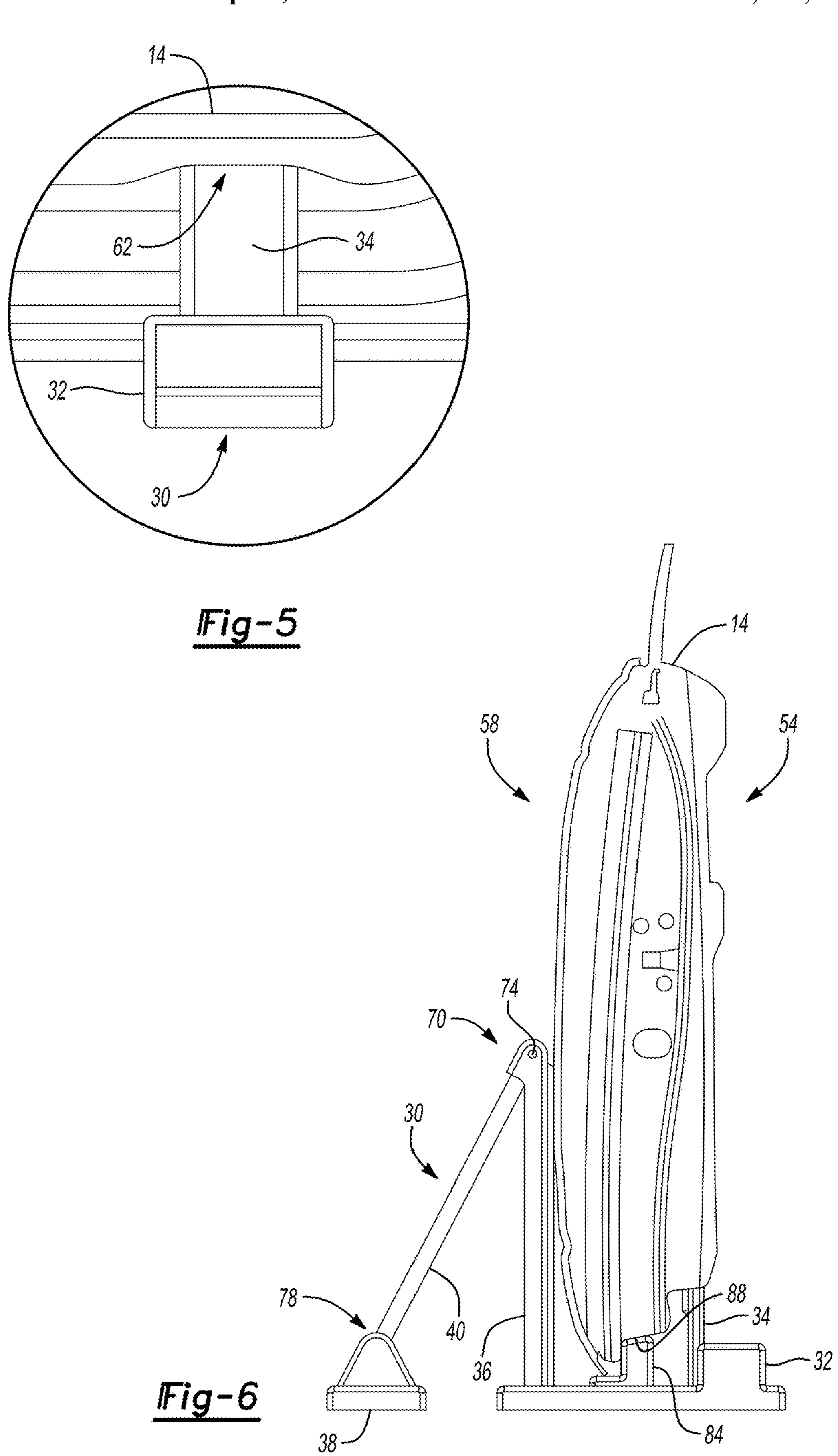
FIG. 5 illustrates a close-up view of an area of FIG. 4.
FIG. 6 illustrates an end view of the door from the vehicle of FIG. 1 supported by the door holder assembly of FIG. 2.

Referring to FIG. 1, an exemplary vehicle 10 includes a door 14, which is shown in an installed position. The door 14 is a driver side door. The vehicle can additionally include a passenger side door. The vehicle 10 is an off-road vehicle and can be characterized as a two-door vehicle as it includes two side doors. Aft of a passenger area of the vehicle 10 is a cargo area 26 that can hold various types of cargo for transport by the vehicle 10. Other vehicles can include a front door and a rear door on both the passenger side and the driver side.

From time to time, a user may wish to operate the vehicle 10 without the door 14 in the installed position.

With reference to FIGS. 2-6, a door holder assembly 30 includes several components. In this example, those components include a primary bracket 32, an interior side upright 34, an exterior side upright 36, a secondary bracket 38, and a brace 40. In this example, the primary bracket 32 and the secondary bracket 38 are separate and distinct components. In another example, the primary bracket 32 and the secondary bracket 38 are provided by different regions of the same bracket structure.

When the door holder assembly 30 is assembled, the interior side upright 34 is disposed within a first pocket 46 of the primary bracket 32 and extends upward from the primary bracket 32. Also, the exterior side upright 36 is disposed within a second pocket 50 of the primary bracket 32 and extends upward from the primary bracket 32. The interior side upright 34 is spaced from a distance D from the exterior side upright 36. The door 14 can be supported above the primary bracket 32 between the interior side upright 34 and the exterior side upright 36.

No fasteners are used to secure the interior side upright 34 and the exterior side upright 36 to the primary bracket 32 in this example. Thus, the interior side upright 34 and the exterior side upright 36 can be quickly assembled and disassembled from the primary bracket 32.

The interior side upright 34 interfaces with an interior side 54 of the door 14 when the door holder assembly 30 is supporting the door 14. The exterior side upright 36 interfaces with an exterior side 58 of the door 14 when the door holder assembly 30 is supporting the door. Interior and exterior are with reference to the vehicle 10 when the door 14 is in an installed position.

In this example, an end region of the interior side upright 34 fits within a recess 62 of the door 14 when supporting the door 14. The recess 62 is a recess provided in the door 14 to be grasped by a user when carrying the door 14. The interior side upright 34 can be a structural foam.

The exterior side upright 36 can be a metal or metal alloy material with a section of felt tape 66 added where the exterior side upright 36 interfaces with the exterior side 58 of the door 14.

A first end portion 70 of the example brace 40 is pivotably secured to the exterior side upright 36 at a pivot 74. The brace 40 is rotated about the pivot 74 and a second end portion 78 of the example brace 40 received within a pocket 82 of the secondary bracket 38 when the door holder assembly 30 is supporting the door 14.

In this example, the door holder assembly 30 includes a support block 84 that fits within a third pocket 86 of the primary bracket 32 between the interior side upright 34 and the exterior side upright 36. The support block 84 can be foam. A bottom side 88 of the door 14 can rest on the support block 84 when the door holder assembly 30 is supporting the door 14. The pockets 46, 50, 86 are sized to accommodate specific components, which can facilitate assembly.

Figure 7:
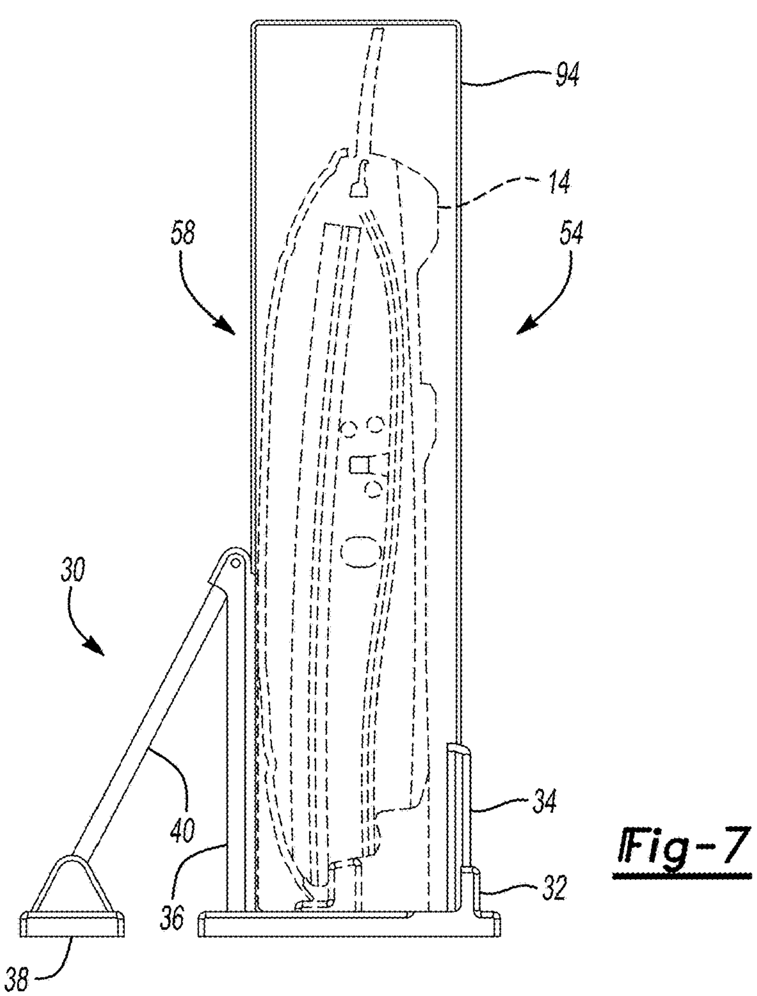
FIG. 7 illustrates another configuration of the door holder assembly of FIG. 2 when the door holder assembly is assembled and supporting the door from the vehicle of FIG. 1 and the door is in a storage bag.

The primary bracket 32 includes a fourth pocket 90. The interior side upright 34 can be received within the fourth pocket 90 instead of within the first pocket 46. When the interior side upright 34 is in the fourth pocket 90, the interior side upright 34 is spaced a further distance from the exterior side upright 36 than when the interior side upright 34 is received within the first pocket 46. A user may choose to place the interior side upright 34 in the fourth pocket 90 so that the door holder assembly 30 can support the door 14 when the door 14 is within a storage bag 94 as shown in FIG. 7.

Figure 8:
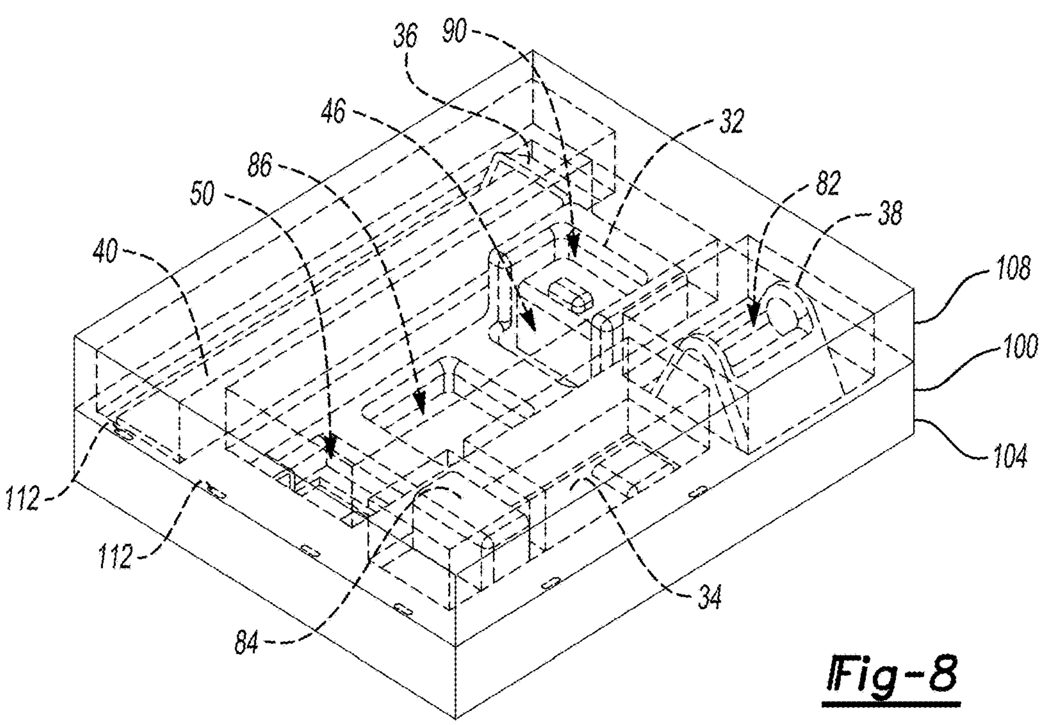
FIG. 8 illustrates the door holder assembly of FIG. 2 when disassembled and enclosed within storage case.

With reference to FIG. 8, the door holder assembly 30 can be stored within a storage case 100 when not in use. The storage case 100 includes a base 104 and a cover 108. The base 104 can be made of a structural foam. The base 104, the cover 108, or both can include a plurality of magnets 112 that can secure the cover 108 to the base 104 to enclose the door holder assembly 30.

In this example, the example door holder assembly 30 is disassembled when enclosed within the storage case 100. The base 104 includes a plurality of pockets to receive the various components of the door holder assembly 30. A first pocket of the base 104 can receive the primary bracket 32. A second pocket of the base 104 can receive the interior side upright 34. A third pocket of the base 104 can receive the exterior side upright 36 and the brace 40. The brace 40 can be pivoted against the exterior side upright 36 when stowed within the third pocket. A fourth pocket of the base 104 can receive the secondary bracket 38. A fifth pocket of the base 104 can accommodate the support block 84.

Each of the pockets within the base 104 can be sized to accommodate a particular component of the door holder assembly 30. This can help the user identify correct positions for the various components and quickly assess whether any components are not within the base 104.

With the components of the door holder assembly 30 enclosed with the storage case 100, the storage case 100 can be placed within, for example, a cargo area of the vehicle 10.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

The invention claimed is:

1. A vehicle door holder system, comprising:
a primary bracket;
an interior side upright removably engaged with the primary bracket and extending upward from the primary bracket when engaged with the primary bracket;
an exterior side upright removably engaged with the primary bracket and extending upward from the primary bracket when engaged with the primary bracket;
a secondary bracket; and
a brace extending from the secondary bracket to the exterior side upright, wherein the interior side upright and the exterior side upright removably engage the primary bracket without mechanical fasteners.

2. The vehicle door holder system of claim 1, wherein the brace is pivotably secured to the exterior side upright.

3. The vehicle door holder system of claim 1, wherein the brace is received within a pocket of the secondary bracket.

4. The vehicle door holder system of claim 1, wherein the interior side upright and the exterior side upright are configured to support a vehicle door.

5. The vehicle door holder system of claim 1, wherein the interior side upright is configured to interface with an interior side of a vehicle door and the exterior side upright is configured to interface with an exterior side of the vehicle door.

6. The vehicle door holder system of claim 5, wherein the interior side upright is configured to be received within a recess of the vehicle door.

7. The vehicle door holder system of claim 1, further comprising a support block positioned within a pocket of the primary bracket between the interior side upright and the exterior side upright, the support block configured to interface with a bottom side of a vehicle door.

8. The vehicle door holder system of claim 7, wherein the support block is foam.

9. The vehicle door holder system of claim 1, further comprising a storage case configured to enclose the primary bracket, the interior side upright, the exterior side upright, the secondary bracket, and the brace.

10. The vehicle door holder system of claim 9, wherein the brace is pivoted relative to the interior side upright to a storage position when the brace and the interior side upright are enclosed within the storage case.

11. The vehicle door holder system of claim 1, further comprising a vehicle door supported in an upright position between the interior side upright and the exterior side upright.

12. The vehicle door holder system of claim 1, wherein the interior side upright is disposed within a first pocket of the primary bracket when engaged with the primary bracket, wherein the exterior side upright is disposed within a second pocket of the primary bracket when engaged with the primary bracket.

13. A vehicle door holder system, comprising:
a primary bracket;
an interior side upright extending upward from the primary bracket;
an exterior side upright extending upward from the primary bracket;
a secondary bracket; and
a brace extending from the secondary bracket to the exterior side upright, wherein the primary bracket includes a first pocket configured to receive the interior side upright, and a second pocket configured to receive the interior side upright, the interior side upright spaced a first distance from the exterior side upright when the interior side upright is received within the first pocket, the interior side upright spaced a different, second distance from the exterior side upright when the interior side upright is received within the second pocket.

14. A vehicle door holder system, comprising:
a primary bracket;
an interior side upright removably engaged with the primary bracket and extending upward from the primary bracket when engaged with the primary bracket;
an exterior side upright removably engaged with the primary bracket and extending upward from the primary bracket when engaged with the primary bracket;
a secondary bracket;
a brace extending from the secondary bracket to the exterior side upright; and
a storage case configured to enclose the primary bracket, the interior side upright, the exterior side upright, the secondary bracket, and the brace, wherein the storage case includes a first pocket that holds the primary bracket, a second pocket that holds the interior side upright and the brace, a third pocket that holds the exterior side upright, and a fourth pocket that holds the secondary bracket.

15. The vehicle door holder system of claim 14, wherein the storage case includes a base and a cover, the base providing the first pocket, the second pocket, the third pocket, and the fourth pocket.

16. The vehicle door holder system of claim 15, wherein the storage case includes a plurality of magnets that secure the cover to the base, wherein the base is a foam base.

* * * * *